Oct. 15, 1968 W. B. MAGUIRE 3,406,367
HOUSING CONSTRUCTION FOR VARIABLE RESISTANCE DEVICE
Filed Nov. 14, 1966

INVENTOR.
WILLIAM B. MAGUIRE
BY
*Gerd L. Mehlhoff*
ATTORNEY

United States Patent Office 3,406,367
Patented Oct. 15, 1968

3,406,367
HOUSING CONSTRUCTION FOR VARIABLE RESISTANCE DEVICE
William B. Maguire, Santa Ana, Calif., assignor to Beckman Instruments, Inc., a corporation of California
Filed Nov. 14, 1966, Ser. No. 594,204
5 Claims. (Cl. 338—184)

ABSTRACT OF THE DISCLOSURE

A fastening arrangement for holding a lid in the end of a housing of a variable resistance device including a hole through an outer side wall of the housing adjacent one end thereof. In the end of the housing there is positioned a cover lid having at least one slot formed in the outer surface of the lid and mating with the hole in the housing and a drive screw inserted through the hole and into the slot so that the threads of the drive screw "bite" into the botom surface of the slot to retain the lid in place.

---

The present invention relates to a variable resistance device and more particularly to an improved arrangement for fastening a lid member across an opening in the housing for such a device.

Variable resistance devices, such as potentiometers and the like, normally comprise a housing including sidewalls defining a cavity that is open on at least one end thereof through which the resistance elements and other components of the device may be assembled. Once the device is assembled, this open end is closed by means of a lid or cover which necessarily must be fastened in some manner to the end or side walls of the housing. In many instances the lid or cover member also carries electrical components which must be precisely located with respect to the remaining components assembled within the housing.

It has been the practice in the past to attach the cover member or lid to the housing by means of screws adapted to fit through the lid into axially tapped holes or radially tapped holes in the sidewalls of the housing. The locating and tapping of such holes in the housing and in the lid is a costly operation and requires extra machining operations. In another arrangement the lid is retained in place by a ring clamp that is tightened around the circumference of the lid and the outer wall of the housing. While this clamping arrangement does not require expensive machining operations it is, in itself, a somewhat expensive and time consuming operation.

Another means for attaching the lid member is to cement it into place by means of plastic adhesives or other cement material. While this is usually a rather inexpensive means for attaching the lid member, it prevents any further removal of the lid for purposes of repair or adjustment of the components within the housing.

It is the object of the present invention to provide a very low cost and simple lid attaching arrangement for the housing of a variable resistance device or the like, which lends itself to the use of molded housing parts and which requires no further machining operations to achieve attachment of the lid member across the opening to the housing.

The advantages of the present invention will become apparent as the following description proceeds and the features of novelty which characterize the invention will be pointed out with particularity in the claims annexed to and forming a part of this specification.

Briefly, the present invention is directed to a variable resistance device or the like having a housing with sidewalls defining a cavity open on at least one end thereof. In order to close the open end of the cavity there is provided a lid member conforming to the shape of the opening and adapted to fit therein with the edges of the lid adjacent the inner surface of the cavity. There is provided at least one hole through a sidewall of the housing in the region of the edge of the lid member. The lid member is provided with at least one slot formed in an externally exposed surface of the lid member and extending to a peripheral edge thereof. The slot is so constructed and arranged as to align with the hole through the sidewall of the housing with the innermost surface of the slot aligned with the innermost edge of the hole through the sidewall. A drive screw is inserted through the hole in the housing and extends into the slot within the lid member with the drive screw threads forming threaded sections in the mutually aligned surfaces of the hole and the slot to firmly secure the lid in place within the open end of the housing.

For a better understanding of the invention references may be had to the accompanying drawing in which.

Figures 1, 2:
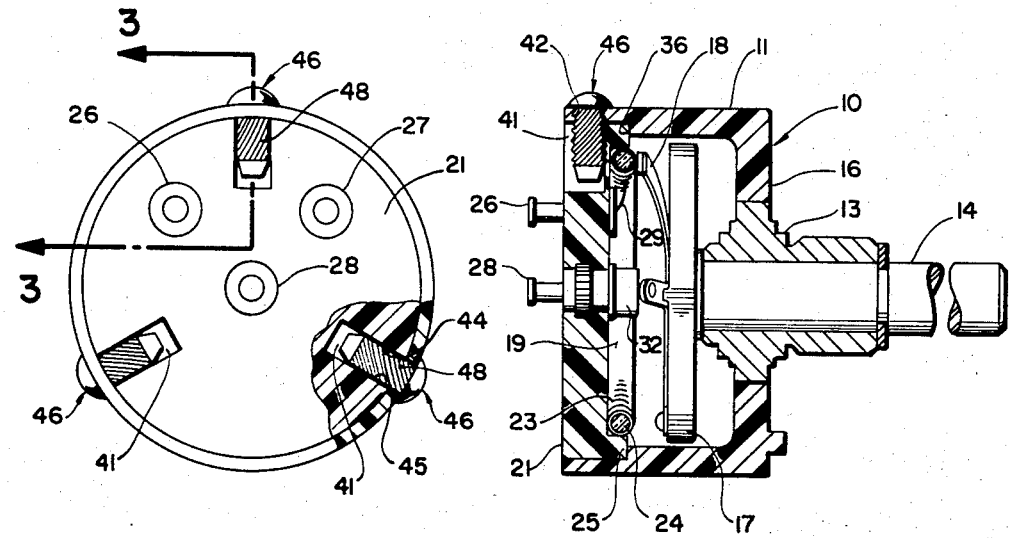
FIGURE 1 is a cross-sectional view of a potentiometer incorporating the lid attaching means of the present invention.
FIGURE 2 is an end view of the potentiometer of FIGURE 1.

Referring now to FIGURE 1, there is shown a single turn rotary potentiometer or variable resistance device including a housing, generally designated by the reference numeral 10, including a sidewall or sidewalls 11 defining a cavity 12 within which are mounted the elements of a variable resistance device. The housing is preferably formed of a plastic material such as nylon or diallyl phthalate which may easily be molded into the desired shape. A drive shaft 14 is rotatably supported by a bushing 13 through the end wall 16 of the housing. Attached to the end of the shaft 14 within the cavity 12, is a rotor assembly including a rotor member 17 preferably formed of a nonconductive material and having attached thereto an electrically conductive movable contact or wiper 18. Wiper 18 is adapted to be rotated about a substantially circular path upon rotation of the potentiometer shaft and rotor 17. The contact or wiper 18 is preferably formed of an electrically conductive spring material and is resiliently biased into engagement with a resistance element 19 which, in the illustrated embodiment of the invention, is supported by a cover or lid member 21 adapted to be positioned across the open end of the housing. The cover or lid member is also formed of a molded plastic material such as diallyl phthalate or the like.

In the illustrated embodiment, the resistance element 19 comprises a fine resistance wire 23 which is helically wound upon an annular mandrel 24. The end cover 21 is molded with an external flange or ring 25 which forms an internal seat for mounting the resistance element 19 therein. It should also be understood that the resistance element 19 could comprise a deposited layer of resistance material formed into an annular ring upon an internal surface of the lid member 21 and so positioned as to be engaged by the resilient contact member 18. Such resistance materials are the well-known cermet or conductive plastic materials which may be deposited in any desired shape with any desired resistance value.

As may best be seen in FIGURE 1, one or both ends of the element may be electrically connected to terminals for connecting the element into an external circuit. In the disclosed embodiment, terminals 26, 27 (seen only in FIG. 2) and 28 are formed as molded inserts within the end cover 21 and extend through the end cover with their base portions exposed closely adjacent the electrical components within the cavity 12. Most specifically, the terminals 26 and 27 are electrically connected to the resistance element 19 through tap connections or lead wires, such as wire 29, which may be soldered or tap welded to the resistance element and to the base sections respectively of terminals. A third terminal 28 is supported centrally within the cover member 21 and includes a conductive collector or base section 32 extending axially into the cavity 12. The collector or base section 32 is engaged by an electrically conductive collector arm 33 carried upon the rotor assembly and electrically in contact with the conductive wiper 18. In practice, it has proved desirable to form the collector arm 33 and wiper 18 in one piece out of the same material. This combination is then staked, or attached in any other well-known manner, to the rotor block 17.

As will be seen in FIGURE 2, the cover lid 21 conforms to the shape of the openings into the cavity 12 and is precisely positioned within the open end of the housing by shoulder means 36 formed around the internal circumference of the sidewalls of the housing. While shoulder means 36 is shown as a solid section of the sidewalls 11 of the housing, it may be molded in any desirable shape so that it engages an inwardly facing surface of the cover lid 21 to locate the cover lid within the open end of the housing.

As will be noted in FIGURE 1, the cover lid 21 is provided with at least one, and preferably a number of slots 41 which may be molded into the lid during the forming process. Slots 41 are formed in the lid member 21 in positions adapted to align with holes 42 formed in the sidewalls of the housing when the lid member 21 is in its proper position in the open end of the housing. As may best be seen in FIGURE 4, the innermost edge 42a of the hole 42 through the sidewall of the housing and the innermost surface or bottom 43 of the slot 41 are aligned when the cover lid is inserted within the open end of the housing. The innermost surfaces of the hole 42 and slot 41 are those surfaces 42a of the hole and the bottom 43 of the slot which are the greatest distance away from the end or outer surface 11a of the housing. In their preferred form, slots 41 are dimensioned so that sides 44 and 45 thereof are spaced apart a distance substantially equal to the diameter of the hole 42. (This is best seen in FIGURE 2.) It may be desirable, however, to make the slots 41 wider than the diameter of the hole 42 so that it its possible to rotate the end cover 21 a short distance to permit minor adjustments in the position of the electrical components attached thereto. For example, it is sometimes desirable to be able to rotate the resistance element 19, attached to the cover lid, a few degrees either direction for phase adjustment of the resistance element with respect to the wiper.

In order to retain the lid cover 21 in place within the open end of the cavity of the housing, the slots 41 are aligned with holes 42 as the lid is positioned within the end of the housing. Retainer pins 46 are forced through the holes 42 into the slots. In the embodiment shown in FIGURES 1-4, the retainer pin 46 is a drive screw having a head portion 47 and a body portion 48 having a plurality of threads formed thereon. The overall diameter of the body of the retainer pin or drive screw 46 is slightly greater than the diameter of the hole 42. Thus, upon forcing the drive screw into the hole 42 and into slot 41 the threads on the drive screw "bite" or cut into the surfaces of the hole and bottom of the slot respectively. As shown in the cut away portion of FIG. 3, in its preferable form, the body portion 48 of the drive pin is also of greater diameter than the distance between the side walls 44 and 45 of the slot, so that the threaded portions of the body actually "bites" into the side walls of the slots. The frictional engagement between the screw threads and the surfaces respectively of the holes in the housing and slots in the cover lid firmly retain these members in place with respect to each other.

The use of slots 41 in the cover lid which are adapted to receive a retaining pin, eliminates the need to precisely machine or drill screw openings or threaded openings in the edge of the sidewall or in the edge of the cover lid. It is a simple matter to form the slots in the end cover within a suitable mold, since the slot forming portion of such a mold does not have to be removed prior to the removal of the part from the mold. This is not possible with "side cored" molds used to form a threaded section or hole, which, by nature of the molding techniques, must be removed prior to removal of the piece and are, therefore, much more expensive and difficult to operate and maintain.

Figures 3, 4:
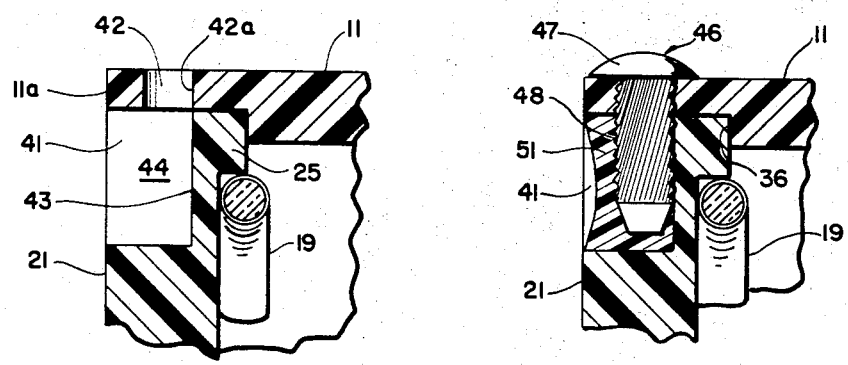
FIGURE 3 is an enlarged cross-sectional view of a portion of the potentiometer taken essentially along line 3—3 of FIGURE 2.
FIGURE 4 is an enlarged cross-sectional view similar to that of FIGURE 3 illustrating a preferred construction for the slot in the lid member and the hole through the housing.

It may be desirable, as will best be seen in FIG. 3, to insert an epoxy or other plastic or adhesive filler material 51 into the slot 41 after the drive pin has been inserted therein. The filler material 51 closes the slot 41 and makes the outer surface of the cover lid smooth. The epoxy or filler material also serves to further retain the drive pin in position within the slot against the bottom surface of the slot, thereby holding the cover lid firmly in place.

Figure 5:
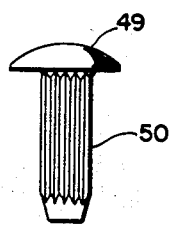
FIGURE 5 illustrates another type of retaining member to be used in the present invention.

Instead of a drive screw 46, a serrated pin, such as the pin 49 shown in FIG. 5, may be employed for retaining the lid cover 21 in place within the end of the housing. The drive pin 49 of FIG. 5 is provided with a plurality of longitudinal serrations 50 adapted to "bite" cut or strip the sidewalls of the hole and the slot when inserted therein. Slots 42 may also be formed with tapered sidewalls so that they are adapted to receive a self-tapping screw which may be threaded through the opening 41.

While in accordance with the patent statutes, there has been described what at present is considered to be the preferred embodiments of the invention, it will be obvious to those skilled in the art that various changes and modifications may be made therein without departing from the invention and it is, therefore, the aim of the appended claims to cover all such changes and modifications as fall within the true spirit and scope of the invention.

What is claimed is:

1. In a potentiometer or the like, the combination comprising:
   a housing including sidewalls defining a cavity open on at least one end thereof;
   a lid member conforming to the shape of said opening in said end of said housing and adapted to fit therein to close said opening to said cavity;
   means in said cavity abutting an inwardly facing surface of said lid member thereby supporting said lid member within said cavity;
   said sidewalls of said housing having at least one hole therethrough, said hole opening in said cavity in the region of the edge of said lid member supported within said open end of said housing;
   at least one slot formed in an externally exposed side of said lid member and extending to a peripheral edge thereof, said slot aligned with said hole through said sidewall of said housing with the innermost surface of said slot flush with the innermost edge of said hole through said sidewall; and
   a retaining member extending through said hole in said housing and into said slot in said lid member, said retaining member having a serrated body portion cut into said hole and said innermost surface of said slot to firmly secure said lid in place within said open end of said housing.

2. A potentiometer as defined in claim 1 in which the dimensions of said slot are such that the sidewalls thereof are spaced apart a distance less than the diameter of said body of said retaining member.

3. A potentiometer as defined in claim 2 in which said retaining member comprises a drive screw having a body portion adapted to cut threads into said respective surfaces of said hole and slot.

4. A potentiometer as defined in claim 1 in which said slot is filled with an adhesive filler material over said retaining member in said slot.

5. A potentiometer as defined in claim 1 in which there are a plurality of slots in said cover lid and mating holes in said housing spaced equidistant around the end of said cover lid and the end of said housing.

References Cited

UNITED STATES PATENTS

| | | | |
|---|---|---|---|
| 651,679 | 6/1900 | Tait | 220—55 |
| 1,043,203 | 11/1912 | Christian | 220—55 |
| 2,352,382 | 6/1944 | Hendricks | 220—55 |
| 2,831,095 | 4/1958 | Matthew | 338—184 X |
| 2,959,633 | 11/1960 | Palmer et al. | 174—50 |

ROBERT K. SCHAFER, *Primary Examiner.*

H. HOHAUSER, *Assistant Examiner.*